Patented Jan. 3, 1928.

1,655,398

UNITED STATES PATENT OFFICE.

HERBERT THAL LEO, OF ST. JOSEPH, MISSOURI.

PROCESS OF MAKING POWDERED OR GRANULAR JELLIFYING COMPOUND.

No Drawing. Application filed July 12, 1921, Serial No. 484,167. Renewed May 6, 1927.

This invention relates to a dry granular powder content of the necessary ingredients for making a pure jelly.

An object of the invention resides in the provision of a process involving a minimum number of operations, economy of manufacture, and simplicity of manipulation during the process, which results in the production of this dry granular powder containing all the necessary ingredients for making a true jelly merely by the mixing of the powder in water and boiling the required length of time.

Another object resides in the proper compounding of the acids, pectous substances, sugar, and any fruit juices, in such a manner that they can be dried to a powdered or granular form for jellifying.

My process comprises the use of a dry powdered or granular substance containing all or any of the following substances: pectose, pectin, pectase, and calcium pectate. This powdered pectous body is manufactured in accordance with the process set forth in my copending application, Serial No. 464,752 filed April 26, 1921, and entitled A dry powder jelly base containing pectin.

In this process I take any desired amount of this pectous powder and dissolve it in any required amount of water by boiling the water. At the same time I add, preferably, granulated sugar or sucrose and boil until both of the above-mentioned ingredients are dissolved in the water. When these substances are in solution, I then add a definite amount of acid, preferably tartaric or citric acid in crystal form. Immediately after the addition of the acid, that is, within three or four minutes, the liquor or solution is subjected to the usual well-known atomizing process to dry the mixture. The mixture of the pectous substances, the acid and the sucrose thereupon forms into a dry powder.

By reason of the fact that the solution is atomized immediately after the acid is added to the solution, the acid has no time to convert the sucrose and, therefore, the dry powder formed will not jellify or coagulate on the operating floor or in the packages in which this powder is sold.

It is to be noted that it is possible, although not preferable, to add the acid to the pectous powder in the water and then add the sucrose or granulated sugar, after which the atomizing step is taken. However, this alternative bath is not as preferable as adding the sugar first, for the reason that when the pectous powder and acid are boiled together the acid has a tendency to destroy the pectin due to the heat.

The powder formed by the atomization of the mixture of pectin products, acid and sugar can be stored or packed in any suitable containers or packages and is ready for use to make pure jelly. In order to make jelly from this powder it is merely necessary to add this powder to the desired amount of water and boil until it commences to jell, or for the proper length of time.

What I claim is:

1. The process of making a jelly-forming substance in dry powder form, which comprises dissolving pectin in water with fruit acid, then adding sucrose, and then immediately drying the solution.

2. The process of making a jelly-forming substance in dry powder form, which comprises dissolving pectin in water with sugar, then adding fruit acid, and immediately drying the solution.

3. The process of making a jelly-forming substance in dry powder form, comprising dissolving pectin in water with fruit acid and then adding sugar and immediately drying the solution by atomization.

HERBERT THAL LEO.